United States Patent
Hutchinson et al.

(10) Patent No.: US 8,332,248 B2
(45) Date of Patent: Dec. 11, 2012

(54) METHOD AND SYSTEM FOR AUTOMATED CENTER WORKFLOW

(75) Inventors: Brenda Hutchinson, Raymond, MS (US); Mark Fautz, Louisville, KY (US); Thomas C. Blackwell, Charlotte, NC (US); Rickey H. Johnson, Jr., Charlotte, NC (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 832 days.

(21) Appl. No.: 12/236,795

(22) Filed: Sep. 24, 2008

(65) Prior Publication Data

US 2010/0076808 A1    Mar. 25, 2010

(51) Int. Cl.
*G06Q 10/00* (2012.01)
(52) U.S. Cl. .............. 705/7.11; 705/7.13; 705/7.15
(58) Field of Classification Search ............. 705/7.11, 705/7.13, 7.15
See application file for complete search history.

(56) References Cited

U.S. PATENT DOCUMENTS

| 7,168,077 | B2 * | 1/2007 | Kim et al. ............... 718/106 |
| 2002/0123983 | A1 * | 9/2002 | Riley et al. ............... 707/1 |
| 2007/0129976 | A1 * | 6/2007 | Hochberg et al. ......... 705/7 |
| 2009/0228579 | A1 * | 9/2009 | Sanghvi et al. ........... 709/224 |

* cited by examiner

*Primary Examiner* — Mark A Fleischer
(74) *Attorney, Agent, or Firm* — Fay Kaplun & Marcin, LLP

(57) ABSTRACT

Described herein are systems and methods for automating workflow of assigning jobs and tracking the process. The exemplary method comprises receiving job data for a plurality of jobs, assigning a current job to one of a plurality of users based on a business rule, sending the current job to the one of the users, and receiving further data for the current job. Additional exemplary methods comprise marking the current job complete when the further data is an indication that the job has been successfully completed. Further exemplary methods comprise sending the current job to a problem resolver when the further data is an indication that the job includes a problem. The exemplary system comprises a job tracking tool receiving job data for a plurality of jobs and assigning a current job to one of a plurality of users based on a business rule, a messaging system receiving the current job from the job tracking tool and forwarding the job to the user; and a work order system receiving the job via the messaging system if the user determines that the job data for the job is correct.

15 Claims, 2 Drawing Sheets

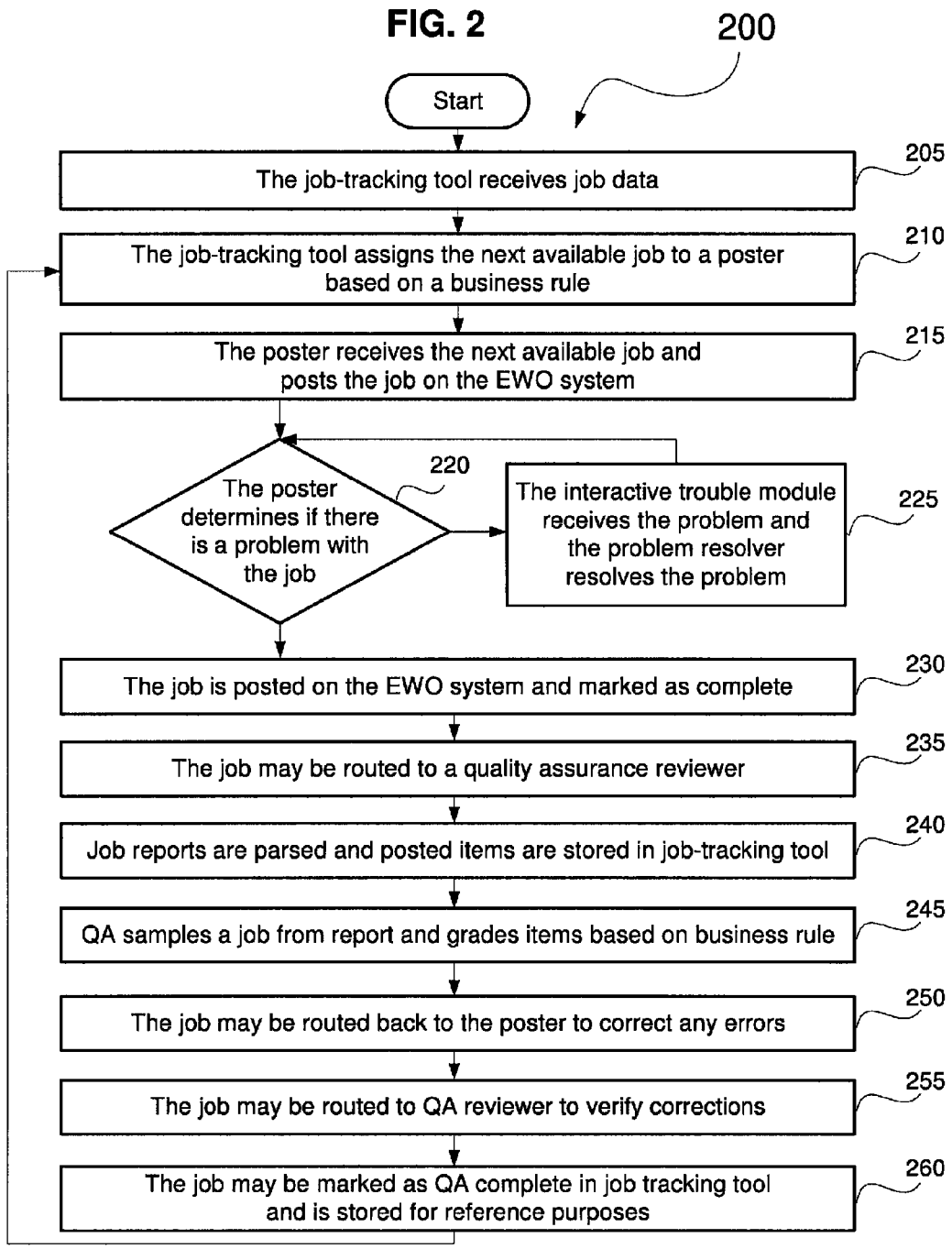

METHOD AND SYSTEM FOR AUTOMATED CENTER WORKFLOW

BACKGROUND

A work order may be defined as either an order received by a business or organization from a client or an order created internally within the business or organization. Generally, a work order may contain the client's information, describe the work to be performed, a task priority, and the job procedure to be followed. Accordingly, the work order may be for products or services and, thus may also include information such as the quantity of the product to be manufactured, built or fabricated, the price and amount of material to be used, the types of labor required, payment structure and rate (e.g., on an hourly basis, on a unit basis, etc.), the total amount of hours worked, etc. In addition, the work order may be, for example, a maintenance or repair request from clients external to the business or from personnel within the business.

An engineering work order ("EWO") may be described as a document used to initiate an engineering investigation, engineering design activity and/or engineering modifications to an item of equipment. Typically, EWOs may be utilized within the telecommunication industries and utility companies. An EWO may allow engineers to produce new designs and maintain a facility model, while enforcing business rules and network connectivity as the engineering work is being performed. Typically, telecommunication industries and utility companies maintain a geographic, connectivity, and financial database of facilities based on the changes made with EWOs. However the process for creating, assigning and managing the EWOs to posters to maintain this database is a purely manual process of printing each job, creating a physical folder for each job, manually determining which job to work on next, manually assigning the job and physically, routing the job to one of a poster, a problem resolution member, a quality review member, etc.

SUMMARY OF THE INVENTION

The present invention generally relates to systems and methods for automating workflow of assigning jobs and tracking the process. The exemplary method comprises receiving job data for a plurality of jobs, assigning a current job to one of a plurality of users based on a business rule, sending the current job to the one of the users, and receiving further data for the current job. Additional exemplary methods comprise marking the current job complete when the further data is an indication that the job has been successfully completed. Further exemplary methods comprise sending the current job to a problem resolver when the further data is an indication that the job includes a problem. The exemplary system comprises a job tracking tool receiving job data for a plurality of jobs and assigning a current job to one of a plurality of users based on a business rule, a messaging system receiving the current job from the job tracking tool and forwarding the job to the user; and a work order system receiving the job via the messaging system if the user determines that the job data for the job is correct.

BRIEF DESCRIPTION OF THE DRAWINGS

FIG. 2 shows an exemplary method for automating workflow of assigning work orders and tracking the process according to an exemplary embodiment of the present invention.

DETAILED DESCRIPTION

Figure 1:
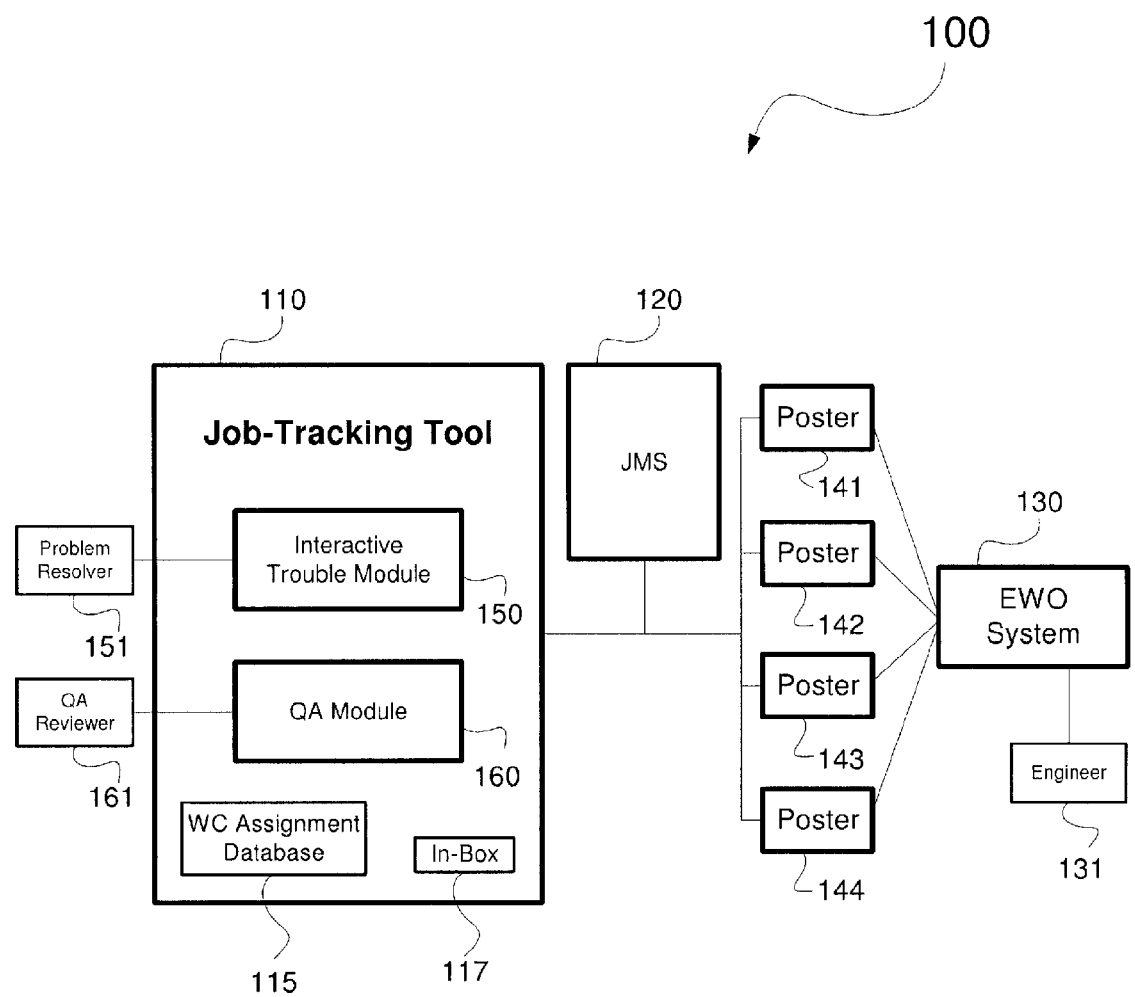
FIG. 1 shows an exemplary system for automating workflow of assigning work orders and tracking the process according to an exemplary embodiment of the present invention.

The exemplary embodiments of the present invention may be further understood with reference to the following description of exemplary embodiments and the related appended drawings, wherein like elements are provided with the same reference numerals. The exemplary embodiments of the present invention are related to systems and methods for automating workflow of assigning jobs and tracking the process. Specifically, the exemplary embodiments are related to systems and methods for automatically capturing work orders (e.g., construction work order, engineering work orders, etc.) and assigning the work order to a job poster based on a business rule. Furthermore, the exemplary embodiments may track the work orders (or "jobs") through the entire process. This may include any problem resolution issues that may arise, as well as quality assurance review.

According to the exemplary embodiments of the present invention, an exemplary workflow system may provide businesses and organizations with the ability to manage and monitor their jobs (e.g., work orders) at a more meaningful and useful level of detail, while also helping to facilitate some labor-intensive activities. The exemplary workflow system may streamline business operations, gather large amounts of data for analysis and business management while eliminating several tasks conventionally associated with such tasks. Specifically, the methods and systems described herein may replace a purely manual process of printing each job, creating a folder for each job, manually determining which job to work next, manually assigning each job and physically routing the job to various departments within the organization. Thus, the automated abilities of the workflow system will save thousands on paper, toner, printers, and labor for conventional clerical processes. Furthermore, the exemplary system eliminates the need for off-site record storage and retrieval.

Throughout this disclosure, the exemplary embodiments of the present invention may refer to one or more users as a "poster". It should be noted that a poster may be responsible for receiving a plurality of assigned jobs (or work orders) based on a business rule. Specifically, each of the posters may have access to a job-tracking tool in order to allow the posters to perform required functions during the process of posting one of the jobs. Accordingly, the poster functions will be described in greater detail below.

The job-tracking tool allows for mechanizing the performance and tracking of quality reviewing work, while automatically gathering data for analysis, such as, for example, error trends, training needs, etc. Furthermore, the mechanized tracking may also provide data for productivity analyses (e.g., on an employee basis, on a project basis, etc.).

FIG. 1 shows an exemplary system 100 for automating workflow of assigning work orders and tracking the process according to an exemplary embodiment of the present invention. The system may include a job-tracking tool 110 for organizing work orders, assigning work orders to one or more posters 141-144, and tracking the job performance of the work order throughout the entire process. According to the exemplary embodiments of the system 100, the job-tracking tool 110 may be web-based software utilizing a communication service to create, send, receive, and read messages from the posters 141-144 in an outside plant records reconciliation center ("OSPRRC"). Accordingly, the OSPRRC may post facility records to a corporate database for review by financial and engineering departments, as well as compliance for continuing property records.

Furthermore, both the job-tracking tool 110 and any one of the posters 141-144 may be in communication with a job management system ("JMS") 120 and an engineering work order ("EWO") system 130. The JMS 120 may store information on a particular job that is used by the engineers, as well as the OSPRRC. The EWO system 130 may provide functionality for automated mapping/facilities management in geographic information system ("AM/FM/GIS"). Accordingly, the EWO system 130 may be in communication with an engineer 131. It should be noted that while the system 100 depicted in FIG. 1 shows there is four posters 141-144, the exemplary embodiments of the present invention may include any number of posters for receiving job-posting assignments from the job-tracking tool 110.

The exemplary job-tracking tool 110 may include a wire center assignment database 115, wherein any job related data (e.g., approved jobs, completed jobs, etc.) received may be stored in the wire center assignment database 115. Specifically, the job-tracking tool 110 may receive job information from the JMS 120 and the EWO system 130, and may then take appropriate action (e.g., route the job or assign the job to a poster 141 to be completed). For example, JMS 120 may export approved jobs to the job-tracking tool 110, wherein the approved jobs may be filed as "pre-post" in the wire center assignment database 115. In addition, JMS 120 may export completed jobs to the job-tracking tool 110, wherein the approved jobs may be filed as "final post" in the wire center assignment database 115.

Once a job is listed as completed in the JMS 120, a comparison may be made between the items of a plant reported by an entity, such as construction, to the items of a plant posted to the records database. This comparison may be performed by a system, such as an AutoCPR system (not shown). If these records match, then a pre-post job may be automatically filed as a final post job (e.g., ("final posted"). The EWO system 130 may notify the job-tracking tool 110 of any jobs that have been final posted. In addition, jobs reviewed by the AutoCPR system may be flagged, thereby allowing the job-tracking tool 110 to recognize these jobs and marks these jobs as complete without user interaction. Specifically, upon notification of an AutoCPR job, the job-tracking tool 110 may mark the job as final post complete and remove it from the pool of assignable jobs. The posting of the job may be handled by the AutoCPR system.

The job-tracking tool 110 may obtain information about the availabilities of the posters 141-144. This information may be retrieved at predetermined intervals, such as on a daily basis. Specifically, the job-tracking tool 110 may include an "in-box" 117, wherein the job-tracking tool 110 generates availability data as each of the users access their in-box 117. Furthermore, the job-tracking tool 110 may maintain a hierarchy of users as well as analysts for various conditions, such as problem resolution, notifications, quality assurance, etc. Furthermore the job-tracking tool 110 may access a directory for user contact information in order to provide problem resolution referrals and notifications. For example, the tool 110 may utilize a user ID from a job to identify and locate the contact information of a user and automatically notify the user of a problem or request completion.

As described above, the job-tracking tool 110 may assign jobs to the poster 141 based on a predetermined set of rules, such as agreed business rules. For instance, jobs may be assigned according to the one or more wire centers that are assigned to each of the posters 141-144. It should be noted that one poster may be assigned to multiple wire centers and multiple posters may be assigned to a single wire center. The one or more wire centers assigned to the poster may also be set by a poster supervisor and may be changed at any time.

Jobs may be assigned on a first-in first-out ("FIFO") basis, regardless of pre-post or final post jobs. Jobs may be assigned as a priority posting issue. The job-tracking tool 110 may be provided with a predetermined minimum and maximum number of jobs to assign to each of the posters 141-144. For example, the job-tracking tool 110 may initially assign three jobs per poster and may not assign any more than five incomplete jobs to a poster at a given time. The predetermined number of jobs assigned to a poster may be set by a poster supervisor and may be changed at any time. It should be noted that the job-tracking tool 110 may notify the poster's supervisor if a job is assigned to a poster and is not completed by the poster within a set number of days.

According to the exemplary embodiments of the present invention, the posters 141-144 may have access to the job-tracking tool 110. Therefore, during the posting of a job, the posters 141-144 may be able to perform any required functions in the tool 110 that are part of the process. The functions of the posters 141-144 within the job-tracking tool 110 may include, for instance, the ability to complete the job in the job-tracking tool 110, enter comments specific to the job, refer any problems to problem resolution personnel, refer corrected jobs back to quality assurance ("QA") personnel, etc. Furthermore, the job-tracking tool 110 allows for the posters 141-144 to have clear accountability for all the jobs assigned to each specific poster. In addition, the problem resolution personnel also has clear accountability for all work received from the poster 141.

The exemplary system 100 may further include an interactive trouble module 150 for handling problem resolution processes, wherein the interactive trouble module 150 may be in communication with the problem resolution personnel, such as a problem resolver 151. Specifically, posters 141-144 may enter and refer problems via the interactive trouble module 150.

Accordingly, when one of the posters 141-144 encounters a problem that is to be referred through the problem resolution process, the poster may populate applicable fields in the interactive trouble module 150. The job-tracking tool 110 may distribute the trouble to an appropriate user to validate the trouble based on a predetermined set of rules, (e.g., a problem referral table). Once the trouble is validated, it may be routed to an appropriate problem resolver 151. While there is a pending problem to be resolved by the problem resolver 151, the job-tracking tool 110 may assign an appropriate hold category to the job. The poster 141 may have the ability to re-refer the job to the interactive trouble module 150 if the problem continues to exist or a different problem is encountered for the same job. When the trouble is cleared, the job-tracking tool 110 may release the hold and distribute the authorization. The job may then be routed back to the originating poster 141 if the hold is released within a certain number of days, as defined by a business rule. Any jobs released outside that set number of days may be routed back to the job-tracking tool 110 as a next available job and, thus, may be assigned to any of the posters 141-144.

The exemplary system 100 may further include a quality assurance ("QA") module 160 for handling problem resolution processes, such as errors in the posted records. Accordingly, the QA module 160 may be in communication with QA personnel, such as QA reviewer 161. The QA module 160 may be incorporated into the inbox of the posters 141-144, the QA reviewer 161, and respective supervisors. The QA module 160 may store attributes for accuracy calculations for all QA functions. It should be noted that while the QA module 160 is depicted in FIG. 1 as being incorporated as a component within the job-tracking tool 110, the QA module 160 may be a separate component from the job-tracking tool 110.

According to the exemplary embodiments of the present invention, a random selection of jobs may be generated by the job-tracking tool 110 and then transmitted to one or more QA reviewers 161. In other words, the job-tracking tool 110 may sample a selection of jobs. These sampled jobs may be first-party jobs, such a jobs assigned to the entity managing the job-tracking tool 110, or these jobs may be third-party jobs, such as vendor jobs. The reviewers 161 may be assigned to one or more QA modules 160 to determine the presence of any errors on a job (e.g., check a sampled job). If no errors are present, the QA module 160 may make the job "QA complete" and the process is complete. If the sampled job is a first-party job and errors are present, the QA module 160 may route the first-party job to an appropriate quality supervisor, wherein the quality supervisors may be assigned based on a hierarchy. The quality supervisor may then indicate whether the error report is QA approved or not approved. If the job is approved by the quality supervisor, the job may be transmitted to vendor QA personnel for additional review. If approved by the vendor QA personnel, the job may be routed back to the poster 141 to fix the errors. It should be noted that any job not approved may be routed back and the supervisor may adjust an error metric. The posters 141-144 may correct all of the errors, and any jobs that are not corrected within a specified timeframe may cause the job-tracking tool 110 to notify the QA personnel and the supervisor of the corresponding poster. Jobs corrected by the posters 141-144 may be routed back to the appropriate QA personnel to be verified. If the corrections are valid, the job may be designated as "QA complete" or "quality closed". If the corrections are not valid, the job may be routed back to the originating poster as necessary.

The quality assurance ("QA") module 160 may also be responsible for vendor quality sampling (e.g., sampling third-party jobs). If the sampled job is a third-party job and errors are present, the job may be immediately routed to the poster, wherein the poster may correct all errors. Similar to first-party jobs, if the job is not corrected within a specified timeframe may cause the job-tracking tool 110 to notify the QA personnel and the supervisor of the corresponding poster. Jobs corrected by the posters 141-144 may be routed back to the appropriate QA personnel to be verified. If the corrections are valid, the job may be designated as "QA complete" or "quality closed". If the corrections are not valid, the job may be routed back to the originating poster as necessary.

The automated sampling process of the QA module 160 may for instance, may be based on a sample size per employee based on certain criteria, such as, for example duration of employment (e.g., newly hired, etc.). This process may ensure timely feedback to the posters 141-144. The quality control data generated from QA module 160 may be stored in job-tracking tool 110 in order to avoid redundancy in other applications. The vendor quality sampling process may include a stored procedure that may run on all completed Pre-Post and Final Post jobs in order to pull a sample for each employee based on the sample size. Thus, quality records may be created with a quality start date and assigned technician for each job pulled for sampling. The technician may be notified of the list of assigned jobs for quality sampling and may have the ability to enter comments and route back to the poster for corrections. Furthermore, the posters 141-144 may have the ability to route back to technician after correction.

The technician may then have the ability to complete the quality sampling of the job and remove the job from the sample.

It should be noted that the QA module 160 may be capable of storing attributes for accuracy calculations for all QA functions. These attributes may include features that present, missing features, a description, FRC, mortality, length/quantity, location, size, tax code, etc. Specifically, an error entry menu may be created by using any of theses attributes assigned to a particular job. Accordingly, based on these associated attributes and error, a QA percentage may be calculated for each job, workgroup, or entire work center. For example, a QA percentage may be calculated for each job by subtracting the number of errors from the number of attributes, and dividing the result by the number of attributes. The QA module 160 of the job-tracking tool 110 may then store the QA percentages from each job and calculate a work center accuracy rate. The job-tracking tool 110 may generate reports for the QA functions at predetermined intervals (e.g., on a daily basis).

FIG. 2 shows an exemplary method 200 for automating workflow of assigning work orders and tracking the process according to an exemplary embodiment of the present invention. It should be noted that method 200 that will be discussed with reference to tool 110 and components of the system 100 of FIG. 1.

Beginning with step 205, the job-tracking tool 110 may receive job data. As noted above, the job-tracking tool 110 may track both approved jobs and completed jobs. Specifically, the JMS 120 may export approved job data to the job-tracking tool 110, wherein this approved job is received as a pre-post. In addition, the JMS 120 may export completed jobs to the job-tracking tool 110, wherein this approved job is received as a final post.

In step 210, the job-tracking tool 110 may assign the next available job to one of the posters 141-144 based on a business rule. According to the exemplary embodiments of the present invention, the job-tracking tool 110 may assign every wire center to at least one of the posters 141-144, such as poster 141. Furthermore, as detailed above, the job-tracking tool 110 may be aware of the availability for each of the poster 141-144. When assigning the next available job, the job-tracking tool 110 may use a business rule such as according to a poster's wire center(s), according to FIFO, according to an order of assignment, etc. In addition, various information specific to the job, such as the age of the job, the size of the job, required land base, etc., may also be a factor when assigning the job to one of the posters 141-144.

In step 215, the poster 141 may receive the job and post the job on the EWO system 130. As described above, the poster 141 may have access to the job-tracking tool 110 in order to perform any required functions (e.g., designate a job as "no post", enter comments, complete the job, etc.) that are part of the posting process.

In step 220, the poster 141 may determine if there is a problem with the job. Problems may include the job needing land or more land base, the job depending on another job, EWO trouble has not been resolved, etc. In any of these events, the poster 141 may notify a responsible party, such as an engineer 131 or team leader associated with the job. In addition, the poster 141 may place a comment within the job and may then refer the job to the interactive trouble module 150. Accordingly, if one or more problems exist, the method 200 may advance to step 225. However, if there are no problems with the jobs, the poster 141 may mark the job as complete and the method 200 may advance to step 235.

In step 225, the interactive trouble module 150 may receive the problem and the problem resolver 151 may resolve the problem. Specifically, the type of problem may be routed to one or more associated parties by the job-tracking tool 110. As described above, the job-tracking tool 110 may distribute the problem to an appropriate user to validate the trouble and once the problem is validated, it may be routed to the appropriate problem resolver 151. Once the job is routed to the problem resolver 151, the problem resolver 151 now has accountability to get the problem resolved and the poster 141 begins working on the next job. However, the job may be routed back to the poster 141 when the problem or problems for the job have been resolved. Therefore, the method 200 may then return to step 220.

In step 230, the job may be posted on the EWO system 130 and may be marked as complete within the job-tracking tool 110. Furthermore, the job may be recorded into a job report, which may be stored for possible quality assurance purposes.

In step 235, the job may be sampled as part of a random selection process and automatically routed to quality reviewer(s) 161 via the QA module 160. Specifically, the QA module 160 may take a random sampling of the jobs for internal quality assurance. For example, each week a random selection of 10 jobs for a specific region may be routed to one or more quality reviewer(s) 161 assigned to that region (e.g., a state). The quality reviewer 161 may determine the presence of any errors and completes the review. The job-tracking tool 110 may then calculates the quality scores in order to generate QA reports. Specifically, the job-tracking tool 110 may import the "work activities" from EWO system 130 and use that as the basis for the quality score calculations (e.g., as the denominator in the QA accuracy percentage). Furthermore, as detailed above, the QA process may include vendor quality sampling. For example, a stored procedure may run nightly on all completed pre-post and final post jobs in order to generate a sample for employee based on the sample size. The sampled jobs may be stored within one or more job reports.

In step 240, the stored job reports may be parsed and posted items may be stored within the job-tracking tool 110.

In step 245, the QA reviewer may cycle through some of the items stored for the sampled job and grade each of the items based on a business rule. Specifically, the QA reviewer 161 assigned to the QA modules 160 may determine whether any errors are present on the sampled job.

In step 250, the job may be routed back to the originating poster 141, wherein any errors may be corrected by the poster 141. As described above, any jobs that are not corrected within a specified timeframe may cause the job-tracking tool 110 to notify the QA personnel and the supervisor of the corresponding poster.

In step 255, the corrected job may be routed to the QA reviewer 161 in order to verify the corrections. In the event the corrections are not valid, the job may be routed back to the originating poster as necessary.

In step 260, the job may be designated as "QA complete" or "quality closed" in the job-tracking tool 110 and the job is record and stored reference purposes.

Upon completion of step 260, the method 200 may return to step 210, wherein the job-tracking tool 110 may assign the next available job to one of the posters 141-144 based on a business rule. The next job may be assigned to the poster 141 once the job is marked "complete" by the poster 141. It should be noted that this designation of complete may be independent from the quality review process described in step 235.

It should be noted that the job-tracking tool 110 may further allow for automated job cancellation functions. Specifically, the JMS 120 may provide the job-tracking tool 110 with a list of cancelled jobs (e.g., on a daily basis). Any jobs identified on the JMS 120 that do not have a corresponding job in the job-racking tool 110 may be ignored. In addition, any jobs identified on the JMS 120 that do have a corresponding job in the job-racking tool 110 may have a "cancel date" populated on the job record. Furthermore, jobs that do not have a start date in the job-tracking tool 110 may be removed from the workflow. The job-tracking tool 110 may create a back out job for any pre-post completed jobs. Back out jobs may then be assigned to a technician as defined by one or more business rules. If the job has been started but not been pre-post completed, the job-tracking tool 110 may create a back out job and notify the technician via a highlighted entry in the technician's in-box.

According to an exemplary embodiment of the present invention, the job-tracking tool 110 may further include an external interface for customer access, such as, for example a "Customer Connection" interface. The Customer Connection may be the contact site for the outside plant records reconciliation center ("OSPRRC") customers. The Customer Connection may contain reports, links (e.g., "quick links", references, referrals, etc.), and any request forms typically used by the customers. For instance, the Customer Connection may provide customers of job status, Loop Makeup assistance, split plat requests, state advocate requests, OSPRRC contact lists, OSPRRC job requests, terminal address corrections, district hold summary requests, work-on-hold reports, etc. The job-tracking tool 110 may automatically assign these requests to one of the posters 141-144 and notify the requester via email upon completion. Thus, the Customer Connection interface of the job-tracking tool 110 may provide both information as well as assistance to these customers. Accordingly, the job-tracking tool 110 may generate corresponding reports, such as job request reports, as well as job schedule reports.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A non-transitory computer-readable storage medium storing a set of instructions that, when executed by a processor, perform the following steps:

receiving job data for a plurality of jobs;

assigning a current one of the plurality of jobs to one of a plurality of users based on a business rule;

sending the current job to the one of the users; receiving further data for the current job;

marking the current job complete when the further data is an indication that the job has been successfully completed;

sending the current job to a problem resolver when the further data is an indication that the job includes a problem;

forwarding the current job to a quality reviewer;

importing step completion data on a work order system;

using step completion data with errors inputted by the quality reviewer to automatically calculate a quality score for the current job;

re-sending the current job to the one of the users to verify that there are no errors; and re-sending the current job to the quality reviewer.

2. The non-transitory computer-readable storage medium of claim 1, wherein the problem resolver to which the current job is sent is based on a type of problem identified by the further data.

3. The non-transitory computer-readable storage medium of claim 1, wherein the steps further comprises:
verifying, prior to sending the current job to the problem resolver, that the problem exists.

4. The non-transitory computer-readable storage medium of claim 1, wherein the steps further comprises:
marking the current job as a hold when the further data is the indication that the job includes the problem.

5. The non-transitory computer-readable storage medium of claim 1, wherein the steps further comprises:
receiving resolution data from the problem resolver indicating that the problem has been resolved; and
sending the job back to the user including the resolution data.

6. The non-transitory computer-readable storage medium of claim 1, wherein the business rule is based on one of a number of uncompleted jobs currently assigned to the user, a geographical location of the user, a geographical location of the job and a type of the job.

7. The non-transitory computer-readable storage medium of claim 1, wherein the steps further comprises:
assigning, after the first assigning step, a next available job to a further user based on a further business rule; and
sending the next available job to the further user.

8. The non-transitory computer-readable storage medium of claim 1, wherein the steps further comprises:
selecting a subset of jobs; and
forwarding the subset of jobs to the quality reviewer, the subset of jobs including the current job.

9. The non-transitory computer-readable storage medium of claim 1, wherein each of the jobs relates to a work order and the user posts the work order to a work order manager.

10. The non-transitory computer-readable storage medium of claim 1, wherein the steps further comprises: determining an availability of the user based on the user's access to an in-box.

11. The non-transitory computer-readable storage medium of claim 1, wherein the current job is selected based on a first in, first out basis.

12. The non-transitory computer-readable storage medium of claim 1, wherein the steps further comprises:
recording the user to which the current job has been sent; and recording the user's progress on the current job.

13. The non-transitory computer-readable storage medium of claim 1, wherein the steps further comprises:
recording the problem resolver to which the current job has been sent; and
recording the problem resolver's progress on the problem.

14. A system, comprising:
a memory;
a processor;
a job tracking tool receiving job data for a plurality of jobs and assigning a current one of the plurality of jobs to one of a plurality of users based on a business rule;
a messaging system receiving the current job from the job tracking tool and forwarding the job to the user; and
a work order system receiving the job via the messaging system if the user determines that the job data for the job is correct, the work order system additionally receiving further data from the user,
wherein the job tracking tool marks the current job complete if the further data is an indication that the job has been successfully completed,
wherein, if the further data is an indication that the job data includes a problem, the job tracking tool verifies that the problem is included in the job data and sends the job to a problem resolver via the messaging system,
wherein the messaging system sends the current iob to a problem resolver when the further data is an indication that the job includes a problem,
wherein the messaging system forwards the current job to a quality reviewer, wherein the work order system receives import step completion data and uses the step completion data with errors inputted by the quality reviewer to automatically calculate a quality score for the current job,
wherein the messaging system re-sends the current job to the one of the users to verify that there are no errors, and
wherein the messaging system re-sends the current job to the quality reviewer.

15. The system of claim 14, wherein the job tracking tool selects the problem resolver based on a further business rule.

* * * * *